United States Patent [19]
Mita

[11] Patent Number: 5,488,672
[45] Date of Patent: Jan. 30, 1996

[54] COLOR IMAGE PROCESSING APPARATUS

[75] Inventor: Yoshinobu Mita, Kawasaki, Japan

[73] Assignee: Canon Kasbushiki Kaisha, Tokyo, Japan

[21] Appl. No.: 200,560

[22] Filed: Feb. 22, 1994

Related U.S. Application Data

[63] Continuation of Ser. No. 844,941, Mar. 4, 1992, abandoned, which is a continuation of Ser. No. 575,681, Aug. 31, 1990, abandoned.

[30] Foreign Application Priority Data

Sep. 5, 1989  [JP]  Japan .................. 1-229784
Oct. 11, 1989 [JP]  Japan .................. 1-264531

[51] Int. Cl.$^6$ ................................ G06K 9/00
[52] U.S. Cl. ........................ 382/167; 358/518
[58] Field of Search .............. 382/17, 162, 167, 382/251, 252, 270; 358/447, 455, 458, 518, 517, 521

[56] References Cited

U.S. PATENT DOCUMENTS

| | | | |
|---|---|---|---|
| 4,533,928 | 8/1985 | Sugiura et al. | 346/140 R |
| 4,752,822 | 6/1988 | Kawamura | 358/80 |
| 4,814,867 | 3/1989 | Tsuda et al. | 358/78 |
| 4,853,768 | 8/1989 | Suzuki et al. | 358/80 |
| 5,057,914 | 10/1991 | Tsuji et al. | 358/80 |
| 5,075,767 | 12/1991 | Takaragi | 358/80 |

FOREIGN PATENT DOCUMENTS

| | | |
|---|---|---|
| 327322 | 8/1989 | European Pat. Off. |
| 2009568 | 7/1979 | United Kingdom |

*Primary Examiner*—Joseph Mancuso
*Attorney, Agent, or Firm*—Fitzpatrick, Cella, Harper & Scinto

[57] ABSTRACT

An image processing apparatus converts n-level image data into m-level image data, where n<m. Types of multivalue processing applied to a main color component and types to sub color components are different, and data thereby obtained are multiplied by predetermined coefficients, then the results of these calculations are added together to obtain data on each color component, thereby enabling an improvement in image quality.

37 Claims, 7 Drawing Sheets

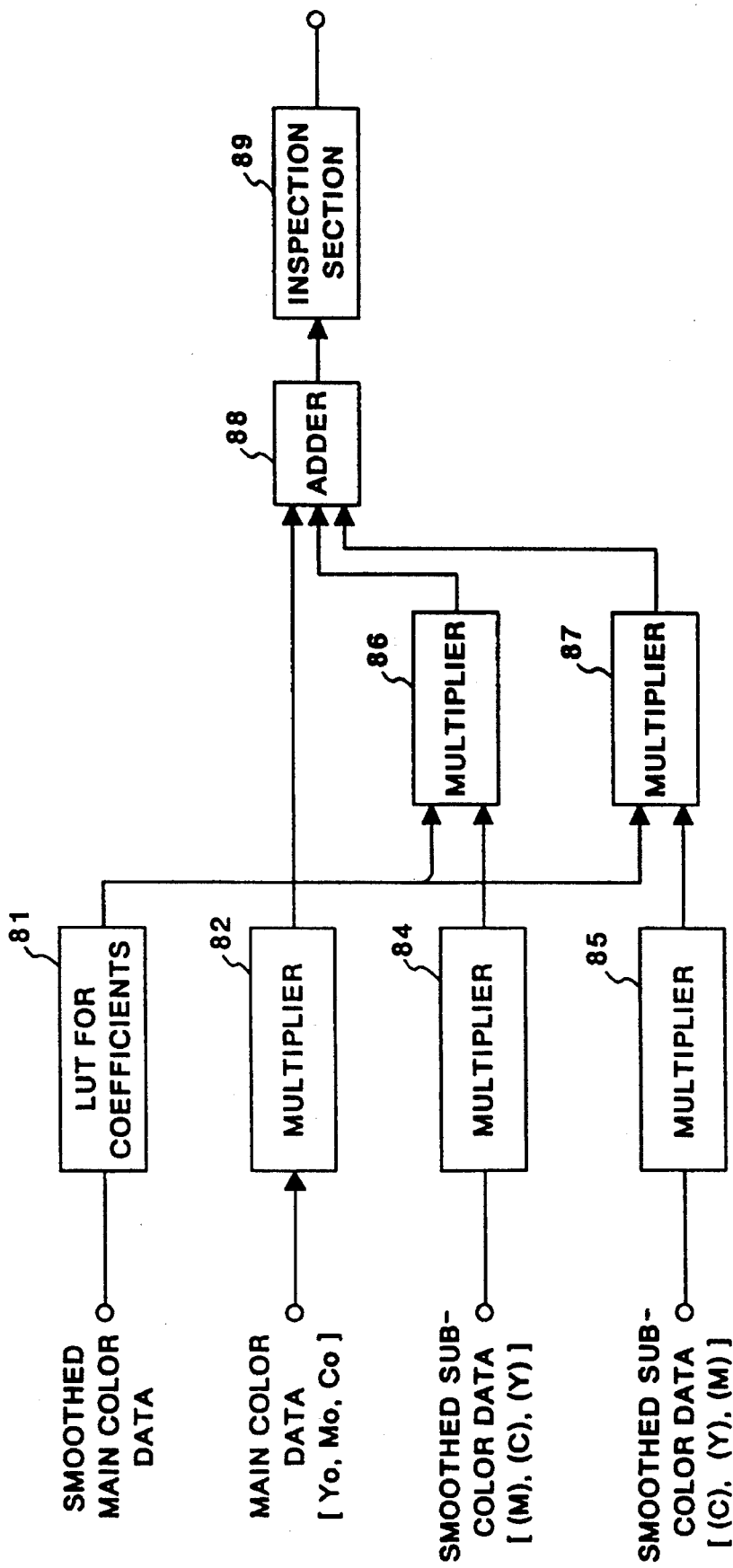
F I G. 4

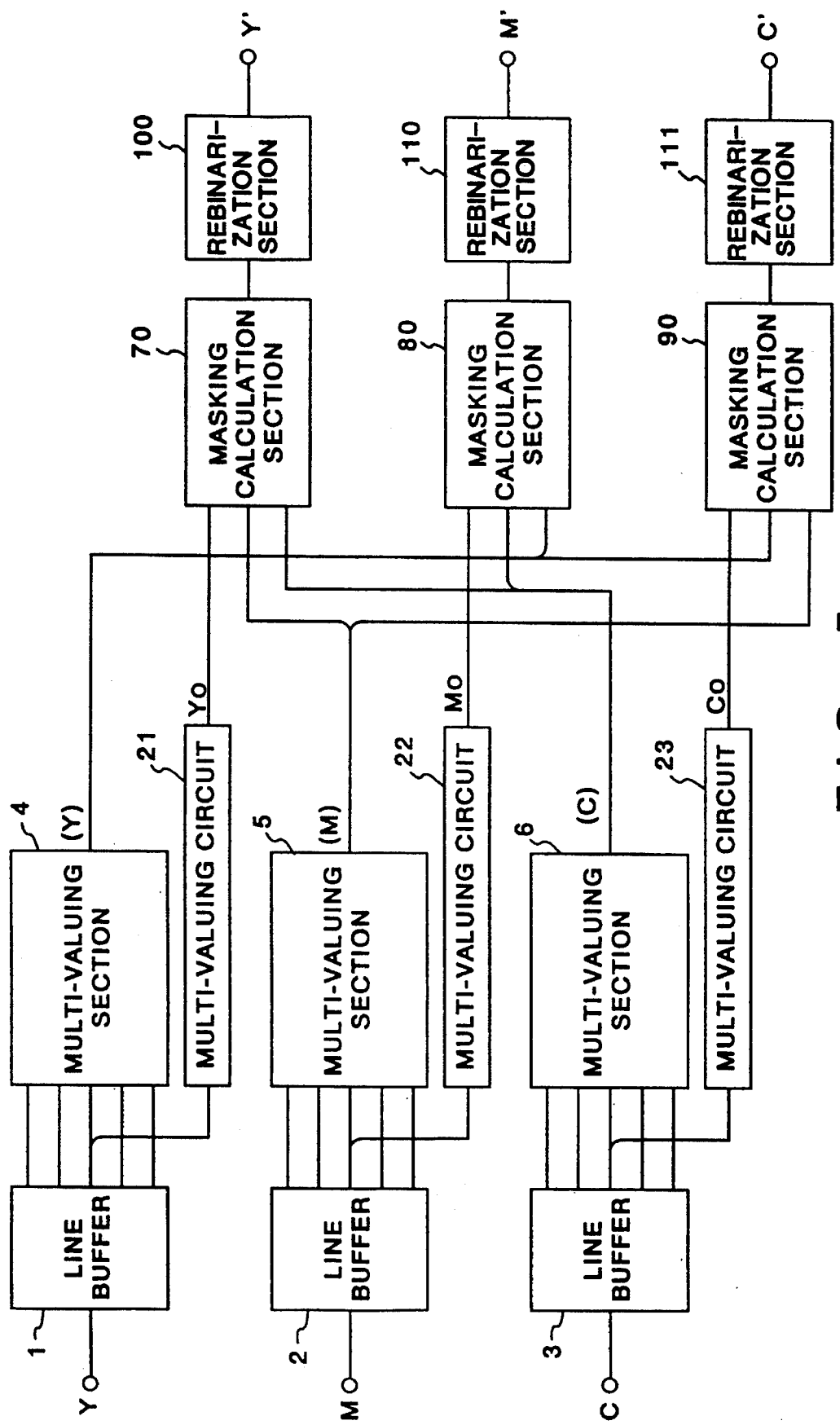
F I G. 5

COLOR IMAGE PROCESSING APPARATUS

This application is a continuation of application Ser. No. 07/844,941 filed Mar. 4, 1992, now abandoned, which is a continuation of application Ser. No. 07/575,681 filed Aug. 31, 1990, abandoned.

BACKGROUND OF THE INVENTION

1. Field of the Invention

This invention relates to an image processing apparatus for processing a n-valued image i.e., an image represented by data having n bits per pixel), such as a binary or ternary image data, by further converting this image data into multivalued image data.

2. Description of the Prior Art

In a case where an image is processed by this kind of apparatus after being converted into a binary image (i.e., one represented by binary data), there is a need for converting the binary image into a multivalued image.

Specifically, for color processing such as masking on a binary image, it is necessary to simultaneously calculate three color images by using three color components, and a technique for converting the binary image into a multivalued image is indispensable.

As a conventional technique for converting a binary image into a multivalued image, a method has been proposed in which the number of dots formed within a rectangular region having a certain size is counted, to obtain the proportion of the region occupied by the dots (hereinafter referred to as "area rate"), and the density is determined by the area rate.

For example, if 8 dots are formed in 4×4 pixel region and if the density range is 8-bit, that is, there are 256 gradations, a density of $$256 \times 8/(4 \times 4) = 128$$

is obtained. In this example, the area rate is "8/(4×4)".

In this conventional method, however, an average density is calculated for each region. That is, this method has the same effect as filtering the image using a smoothing filter. Edge portions and the entire resulting image are therefore blurred.

In particular, in a case where the input binary image corresponds to characters or pictures, the resolution is reduced and the quality of the resulting image is considerably deteriorated.

SUMMARY OF THE INVENTION

It is an object of the present invention to provide an image processing apparatus which is capable of forming a multi-valued image while minimizing the reduction in resolution to improve the quality of the image after the image has been color-processed by a masking process or the like.

One aspect of the present invention is to provide an image processing apparatus having a multi-valuing means for forming from an n-valued image such as a binary, ternary or quaternary image, an m-valued image which is also a multivalued image, and for supplying the m-valued image to a masking processing section, and a masking processing means for color-processing the m-valued image by a masking process, in which the masking processing means serves to perform different types of multivalued processing on the main color component and other color components and to perform color masking processing on obtained data.

Another aspect of the present invention is to provide an image processing apparatus in which the multivaluing means outputs data smoothed with respect to a region in the vicinity of a target pixel, and the masking processing means multiplies non-smoothed m-valued data by a masking coefficient with respect to a first (or "main") color component (i.e., yellow in the first line of equation (1) and in equation (2) below, magenta in the second line of equation (1) and in equation (3), and cyan in the last line of equation (1) and in equation (4)) and multiplies the smoothed data by masking coefficients with respect to other color components ("sub-color components", i.e., magenta and cyan in equation (2), yellow and cyan in equation (3) and yellow and magenta in equation (4)).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a block diagram of a masking calculation section of the first embodiment;

FIG. 5 is a block diagram illustrating the construction of a color processing unit of an image processing apparatus in accordance with the second embodiment of the present invention.

DESCRIPTION OF THE PREFERRED EMBODIMENTS

Figure 1:
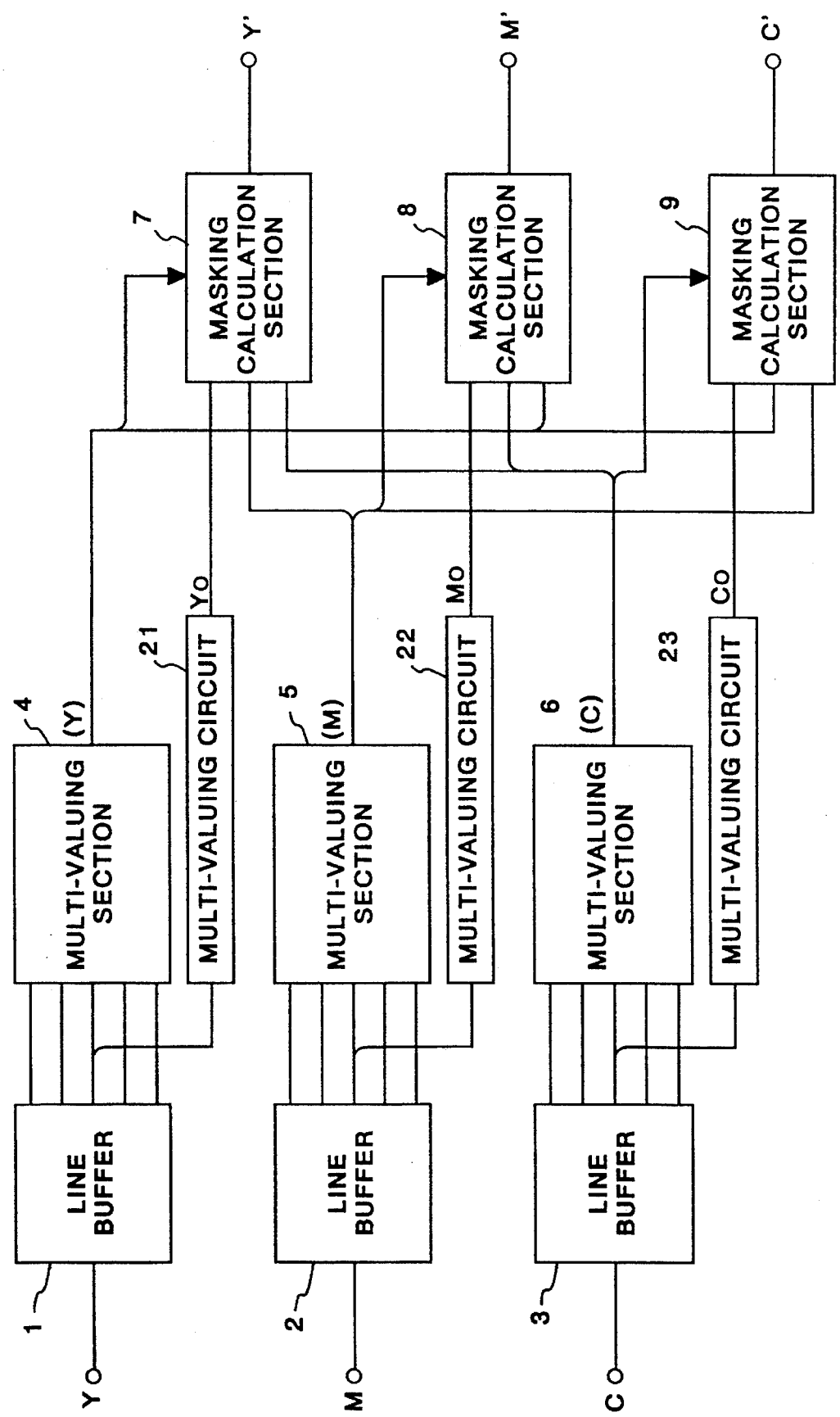
FIG. 1 is a block diagram illustrating the construction of a color processing unit of an image processing apparatus in accordance with the first embodiment of the present invention.

The preferred embodiments of the present invention will be described in detail with reference to the accompanying drawings.

First Embodiment

[Explanation of the principle of color processing]

Equation ① is a matrix calculation equation ordinarily used for masking.

$$\begin{bmatrix} Y' \\ M' \\ C' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y \\ M \\ C \end{bmatrix} \quad 1$$

where Y, M and C represent data of each of three color components (yellow, magenta and cyan) before masking processing; Y', M' and C' represent data of each of the color components $a_{11}$ after masking processing; and $a_{11}, \ldots a_{33}$, represent masking coefficients.

No problem is encountered if this calculation equation ① is directly applied to a primary multivalued image (8-bit image data or the like). However, if it is applied to a multivalued image obtained by filtering a binary image with a smoothing filter in the above-mentioned manner, the resulting image is blurred.

In this embodiment, the masking calculation (or "masking"correction) is performed by using multi-valued data obtained from binary data on a main (i.e., a first) color, while using smoothed density data for sub colors (colors other than the main color). And for sub-colors, masking coefficients for the primary multivalued image multiplied by correction coefficients, are used.

That is, more concretely, masking is performed by using the following equations ②, ③, and ④:

$$Y' = a_{11} \cdot Y_0 + \frac{255}{(Y)} a_{12} \cdot (M) + \frac{255}{(Y)} a_{13} \cdot (C) \qquad ②$$

$$M' = \frac{255}{(M)} a_{21} \cdot (Y) + a_{22} \cdot M_0 + \frac{255}{(M)} a_{23} \cdot (C) \qquad ③$$

$$C' = \frac{255}{(C)} a_{31} \cdot (Y) + \frac{255}{(C)} a_{32} \cdot (M) + a_{33} \cdot C_0 \qquad ④$$

$Y_0$, $M_0$ and $C_0$ represent data (0 or 255) obtained by converting each binary datum for yellow, magenta and cyan for each pixel into simple multivalued data, and $(Y)$, $(M)$ and $(C)$ represent smoothed density data for yellow, magenta and cyan obtained by smoothing a region in the vicinity of the target pixel by a smoothing process.

For example, with respect to a masking calculation for a main color, yellow signal $Y_0$ which is obtained by converting binary data into multivalued data, is used, while, with respect to magenta and cyan which are sub-colors for calculating the masking correction for yellow, smoothed density data (M) and (C) are used for the masking calculation.

The reason for using (M) and (C) for the sub colors, which are data obtained by smoothing a region in the vicinity of the target pixel, is as follows. That is, since in this case the original image data is binary, $Y_0$ has a value of 0 or 255 for each pixel. There is, therefore, a possibility of the color of one target pixel being made utterly different from that of the primary image if only target pixel is examined to obtain its multivalued data. In this embodiment, a principle is used that a printed image, for example, consisting of dots with colors looks like an image with an ordinary color when it is seen macroscopically from a distance because these dots are mutually mixing and high-frequency components of the dots cannot be discriminated by the human. (M) and (C) which are values obtained by smoothing a region in the vicinity of the target pixel are used to remove high-frequency components per dot unit of the binary image to obtain the original color.

As expressed by equation ②, the coefficients for the sub-colors, magenta and cyan, are $255/(Y) \times a_{12}$ and $255/(Y) \times a_{13}$, respectively, when the coefficients primarily used for masking multivalued image are $a_{12}$ and $a_{13}$.

These coefficients are determined so as to eliminate errors owing to the calculation using binary data to obtain suitable effects.

That is, since, in this case, masking calculation is performed by using the binary datum for the main color, yellow, without changing its binary state, $Y_0$ will be either 0 or 255 when it is normalized to 8-bit form. If $Y_0=0$, the data "underflows" as a result of the masking calculation, that is, $Y'=0$, because the coefficients $a_{12}$ and $a_{13}$ for the sub colors are ordinarily negative.

Accordingly, underflow occurs unless $Y_0=255$. Then, in the case of $Y_0=255$, it is necessary to add the amount of masking process which is to be subtracted from the pixel position where $Y_0=0$.

If the value of smoothing of the main color, yellow, in the vicinity of the target pixel is (Y), the area rate (probability) of $Y_0=255$ is (Y)/255. The reciprocal of this value, i.e., $255/(Y)$ is used as a correction coefficient; masking coefficients $a_{12}$ and $a_{13}$ for the sub color are multiplied by $255/(Y)$, thereby making the amount of subtraction for masking in the vicinity of a certain region suitable.

Similarly, for calculation of the magenta component, the masking coefficients for smoothed sub-colors, yellow and cyan, are $255/(M) \times a_{21}$, and $255/(M) \times a_{23}$, respectively. Also, for calculation of the cyan component, the masking coefficients for smoothed sub colors, yellow and cyan, are $255/(C) \times a_{31}$, and $255/(C) \times a_{32}$, respectively.

Embodiment

FIG. 1 is a block diagram illustrating the construction of a color processing unit of an image processing apparatus in accordance with the first embodiment.

Binary data Y, M, and C, which are three color components of color image data, are input into respective line buffers 1 to 3 corresponding to each color component, and main scanning direction line data including data on a target pixel, are output from these line buffers to be delivered to multi-valuing circuits 21 to 23 corresponding to each color component (circuits 21 to 23 may, with line buffers 1 to 3, be considered input means).

Line data from respective line buffers 1 to 3 are input into multi-valuing sections 4 to 6 (which serve as calculating means in this embodiment), and are converted to 8-bit multivalued data by the multi-valuing circuits 21 to 23 and the multi-valuing sections 4 to 6. Thus, masked data Y', M', and C' which are calculated by masking calculation sections 7 to 9 (which serve here to correct the signals in some desired manner) based on above mentioned equations ②, ③, and ④ are obtained.

The construction of the color processing unit shown in FIG. 1 will be described below in more detail.

Figure 2:
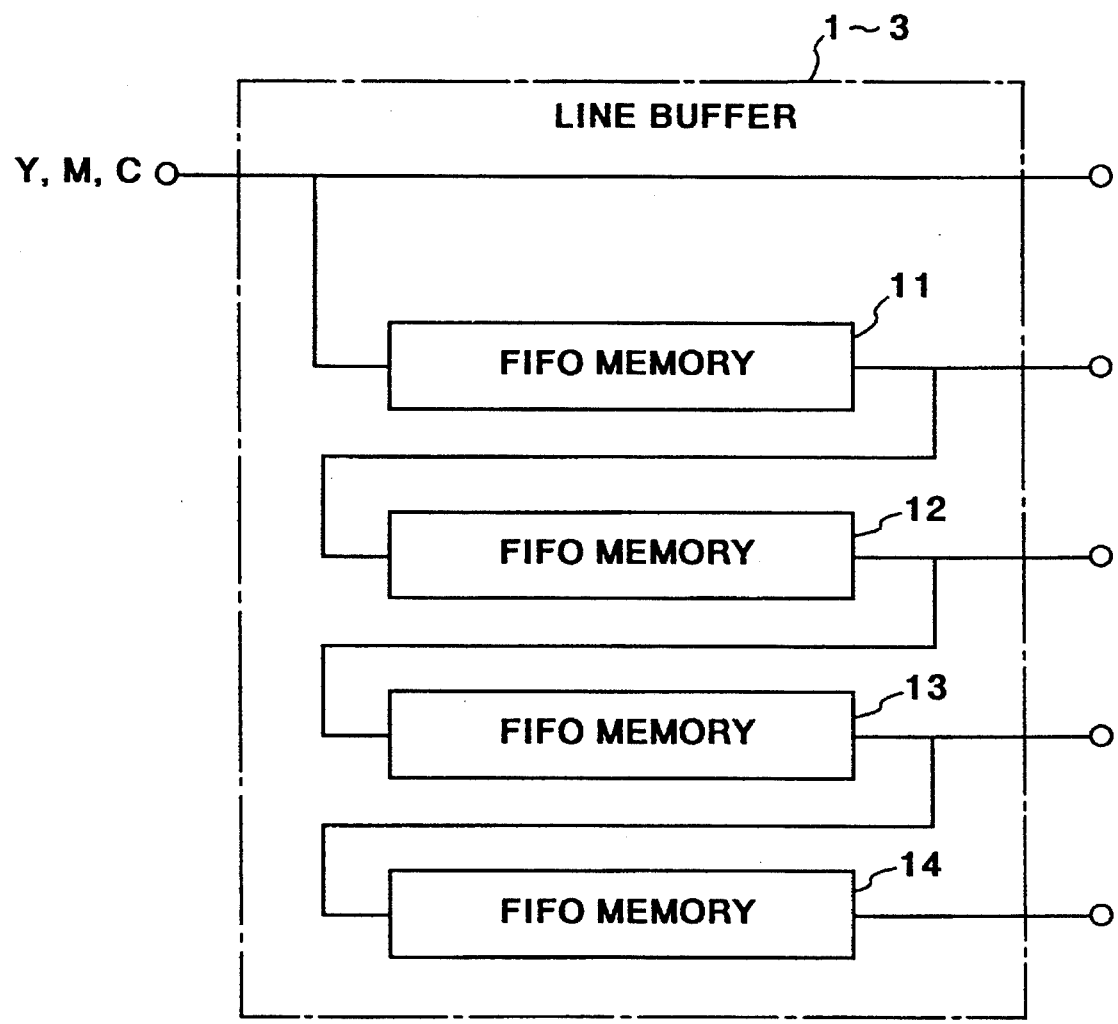
FIG. 2 is a block diagram of a line buffer in accordance with the first embodiment.

FIG. 2 is a block diagram illustrating the construction of each of the line buffers 1 to 3.

Each of the line buffers 1 to 3 has FIFO (first-in-first-out) type memories 11 to 14. Input image data (Y, M, or C) is first input into the FIFO memory 11 and is output after a period of time corresponding to one horizontal period, that is, it is delayed for one line. The data output from the FIFO memory 11 is simultaneously input into the FIFO memory 12. Similarly, data is output from each of the FIFO memories 13 and 14 after being delayed for one line in each.

Of the data output from each of the line buffers 1 to 3, the horizontal line data containing data on the target pixel is supplied from the FIFO memory 12 corresponding to each of the multi-valuing circuits 21 to 23. Each of the multi-valuing circuits 21 to 23 serves only to process the binary data, 1 or 0, so as to increase the absolute value of the binary data. For example, it sets the binary data to 0 or 255 to simply convert the input data into 8-bit multivalued data.

In the multi-valuing sections 4 to 6, smoothing and multi-valuing of a region in the vicinity of the target pixel are accomplished as described below.

Figure 3:
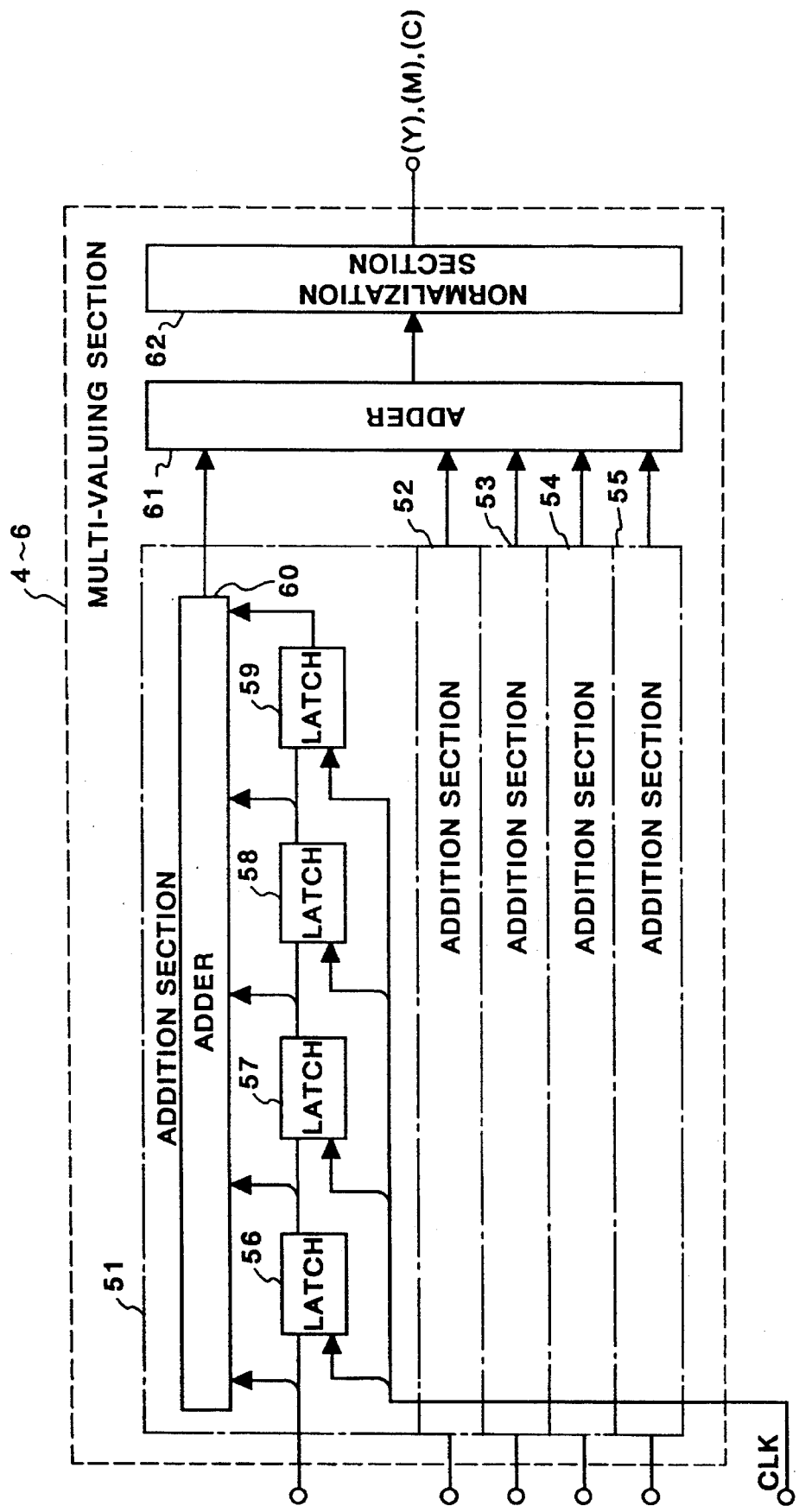
FIG. 3 is a block diagram of a multi-valuing section of the first embodiment.

FIG. 3 is a block diagram illustrating the construction of each of the multi-valuing sections 4 to 6.

The output from each of the line buffers 1 to 3 is input to addition sections 51 to 55 in the corresponding multi-valuing sections 4 to 6. The operation of the multi] valuing section 4 will be described below with respect to the color component Y alone. Each of the addition sections 51 to 55 is provided with latches 56 to 59. (In FIG. 3, only the internal construction of the addition section 51 is illustrated.) Data delivered to the addition sections 51 to 55 are shifted by one pixel each time image transfer clock CLK rises, and the number of "1" levels in five successive pixels in a horizontal line is calculated in an adder 60. Sums output by the addition sections 51 to 55 are supplied to an adder 61 to be added with respect to five successive lines in the vertical direction of the image. That is, the adder 61 calculates and outputs the sum of "1" levels in a set of 5×5 pixels where the target pixel is located at the center of them (it is the same as the number of dots in 5×5 pixels in this case). Data output from the adder 61 is then supplied to a normalization section 62 to be normalized into, for example, 8-bit data. That is, the output value from the adder, which ranges between 0 and 25, is normalized to be represented by 8-bit values of 0 to 255. By this process, the smoothed value (Y) in the vicinity of the target pixel is obtained. Similarly, (M) data is output from the multi-valuing section 5 and (C) data is output from the multi-valuing section 6. Ordinarily, in the case of 8-bit normalization, a smoothed value of the color in the vicinity of a target pixel can be expressed by:

$$256 \times \frac{\text{(the sum of pixels in a region)}}{\text{(the total number of pixels in the region)} \times \text{(the number of gradations} - 1)}$$

Smoothed data (Y), (M), and (C), and $Y_0$, $M_0$, and $C_0$, the main colors for masking, which are output from the multi-valuing circuits 21 to 23 as shown in FIG. 1, are supplied to the masking calculation sections 7 to 9 for calculations described below.

FIG. 4 is a block diagram illustrating the construction of each of the masking calculation sections 7 to 9.

The masking calculation sections 7 to 9 perform a processing corresponding to equations ② to ④, respectively.

The procedure of execution of calculation using equation ② in the masking calculation section 7 will be described below.

Referring to FIG. 4, an LUT for coefficients 81 forms a table in which the result of calculation 255/(Y) performed by inputting (Y) that is the smoothed data of main color from the multi-valuing section 4, is previously stored. A multiplier 82 is supplied with the main color data, $Y_0$, which is the output from the multi-valuing circuit 21, and outputs $a_{11} \cdot Y_0$ by multiplying $Y_0$ by $a_{11}$.

Smoothed sub color data, (M) and (C), obtained by the multi-valuing sections 5 and 6 are respectively input into multipliers 84 and 85, and are multiplied by masking coefficients for the sub color, thereby calculating and outputting $a_{12} \cdot (M)$ and $a_{13} \cdot (C)$.

The results of these calculations are then input into multipliers 86 and 87 and multiplied by 255/(Y) which is the output from the LUT for coefficients 81, thereby obtaining $255/(Y) \times a_{12} \cdot (M)$ and $255/(Y) \times a_{13} \cdot (C)$.

The outputs from the multipliers 86 and 87 and the output $a_{11} \cdot Y_0$ from the multiplier 82 are added to each other in an adder 88, thereby obtaining $$a_{11} \cdot Y_0 + \frac{255}{(Y)} a_{12} \cdot (M) + \frac{255}{(Y)} a_{13} \cdot (C)$$

as is expressed by equation ②.

The result of this calculation is checked by an inspection section 89 with respect to overflow or underflow. This check is required because there is a possibility that $a_{11}$ exceeds 1.0 and $a_{12}$ and $a_{13}$ are ordinarily negative. In this embodiment, the inspection section 89 using 8-bit multivalued data, sets data to 0 when a result of calculation is 0 or less and forcibly sets data to 255 when the result is 255 or greater.

In the masking calculation sections 8 and 9, the same calculations as those performed by the masking calculation section 7 are also performed to obtain M' and C'.

In the above-described masking processing, no smoothing operation is applied to the main color component, and the image data after that processing becomes very close to the original image. Even in a case where the multivalued image obtained by this method is processed by various kinds of image processing, or simply is set to binary form, or processed by a dither method or an error diffusion method, it is possible to readily obtain an image with a high fidelity to the original image, even processed by masking.

In accordance with this embodiment, in a case where masking is applied to an n-valued image such as a binary or ternary image, calculation is performed using non-smoothed image data for a main color, while calculation is performed using smoothed data for sub-colors, whereby it is possible to perform masking on the n-valued image without impairing edge information and maintaining the accuracy of desired dot positions. Thus, the present invention is effective in improving the image quality.

In the above-described embodiment, non-smoothed data is used for the main color. However, the same effect can be obtained by making the size of the matrix for smoothing of the main color smaller than that of the matrices for smoothing of other colors. It is essential to use a different type of smoothing with respect to a main color and other colors. In other words, to improve the image quality, types of multi-valuing processing applied to a main color and types to other colors are different, and after such processing the color masking processing is performed on the obtained data.

Second Embodiment

A second embodiment of the present invention will be described below.

In the second embodiment, masking calculation is performed by using multivalued data obtained from binary data on a main (i.e. a first) color, while using smoothed density data for sub colors (colors other than the main color), as in the case of the first embodiment.

More specifically, masking is performed by using equations ⑤, ⑥, and ⑦:

$$Y' = a_{11} \cdot Y_0 + a_{12} \cdot (M) + a_{13} \cdot (C) \qquad ⑤$$

$$M' = a_{21} \cdot (Y) + a_{22} \cdot M_0 + a_{23} \cdot (C) \qquad ⑥$$

$$C' = a_{31} \cdot (Y) + a_{32} \cdot (M) + a_{33} \cdot C_0 \qquad ⑦$$

where $Y_0$, $M_0$ and $C_0$, and (Y), (M) and (C) and so on in these equations are the same as those in the first embodiment. That is, $Y_0$, $M_0$ and $C_0$ represent data obtained by converting binary datum for yellow, magenta and cyan into multivalued data for each pixel, and (Y), (M) and (C) represent smoothed density data of yellow, magenta and cyan obtained by smoothing a region in the vicinity of a target pixel by a smoothing process.

Masking calculation in the second embodiment is performed in the same manner as in the case of the first embodiment. That is, with respect to masking calculation for the main color, yellow, $Y_0$, obtained by converting binary data into multivalued data, is used, while, with respect to magenta and cyan, which are sub-colors, smoothed density data (M) and (C) are used for the masking calculation.

(M) and (C), which are the data obtained by smoothing a region in the vicinity of the target pixel, are used for the sub colors in order to remove high-frequency components per dot of the binary image and to thereby obtain the original color, as described above.

FIG. 5 is a block diagram illustrating the construction of a color processing unit of an image processing apparatus in accordance with the second embodiment.

In the color processing unit shown in FIG. 5, line buffers 1 to 3, multi-valuing sections 4 to 6 and multi-valuing circuits 21 to 23 are the same in respect of construction and function as the corresponding components of the first embodiment, and the description for them will not be repeated.

Figure 6:
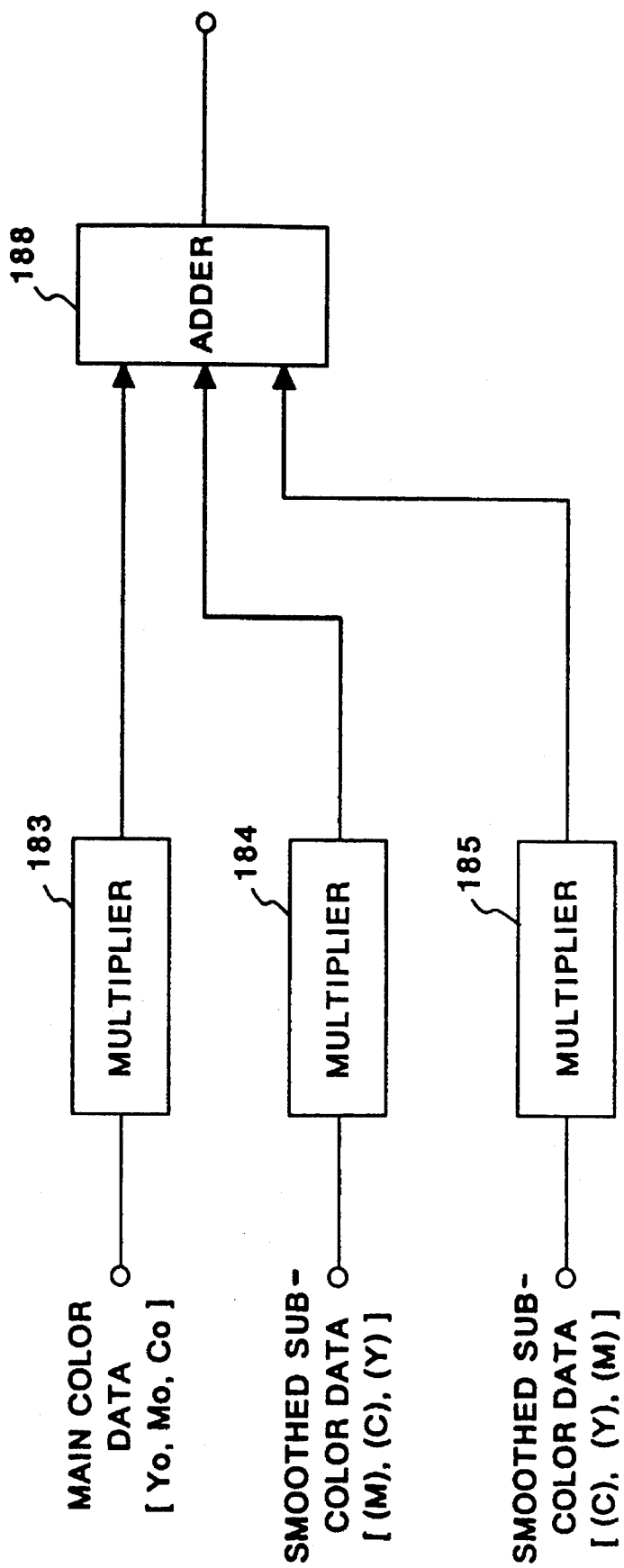
FIG. 6 is a block diagram of a masking section of the second embodiment.

FIG. 6 is a block diagram illustrating the construction of each of masking calculation sections 70, 80, and 90 (masking calculation sections 70, 80, and 90 may be considered as masking means).

The masking calculation sections 70, 80, and 90 correspond to equations ⑤ to ⑦, respectively. The procedure of execution of calculation using equation ⑤ in the masking calculation section 70 will be described below.

A multiplier 183 is supplied with main color data $Y_0$ which is the output from the multi-valuing circuit 21 and outputs $a_{11}.Y_0$ by multiplying $Y_0$ by $a_{11}$.

The smoothed data for the sub-colors, (M) and (C), from the multi-valuing sections 5 and 6 are respectively input into multipliers 184 and 185, and are multiplied by masking coefficients for the sub color, thereby calculating and outputting $a_{12}.(M)$ and $a_{13}.C)$.

The results of these calculations are input into an adder 188 and added with the output $a_{11}.Y_0$ from the multiplier 183, thereby obtaining:

$$a_{11}.Y_0 + a_{12}.(M) + a_{13}.(C)$$

as is expressed by equation ⑤.

Also, in the masking calculation sections 80 and 90, the same calculations as those performed by the masking calculation section 70 are performed to obtain M' and C'.

If these calculation results are checked with respect to overflow or underflow and the data are converted into binary data again by a rebinarizing circuit, an overflow or an underflow may be corrected as described with respect to FIG. 4 according to the number of bits of the rebinarizing circuit. In this embodiment, however, such correction is not executed. This is because an error diffusion method or an average density storage method is adopted as a method of re-conversion into binary data, as described below.

In the above-described masking processing, no smoothing operation is applied to the main color component, and the image data after that processing becomes very close to the original image. Even in a case where the multivalued image obtained by this method is processed by various kinds of image processing, or simply made binary, or processed by a dither method or an error diffusion method, it is possible to readily obtain an image with a high fidelity to the original image and even with processing by masking.

In a case where performing a conversion to binary from again corresponding to the results of masking supplied from the masking calculation sections 70, 80, and 90, rebinarization sections 100, 110 and 111 (which serve in this embodiment to convert the data into 1-bit data), rebinarization sections 100, 110, and 111 may be considered binarizing means shown in FIG. 5 serve to rebinarize based on the conversion to binary method, such as an error diffusion method or an average density storing method, in which density storage is performed before and after rebinarization (the use of the words "reinarize" and "rebinarization" is for convenience, and is not to be taken as limiting the process to data that is originally binary; as stated above, ternary, quaternary or other multilevel data can be the original data).

By adopting such binarization as density storage type, the data after masking process is effectively diffused to nereby pixels even if the data overflows or underflows, thereby making it possible to perform masking with accuracy.

For example, if re-conversion into binary data is performed based on a dither method, an underflow or an overflow will be omitted and it is impossible to obtain suitable masking effects. This is because the output of the binary image after masking underflows or overflows at a high rate unlike the result of masking of the multivalued image, and because the underflow has a large negative value or the overflow has a very large value in comparison with multivalue masking. In this embodiment, therefore, a conversion to binary of density storage type is adopted to obtain accurate results in masking.

The present invention is not limited to the above-described embodiments. For example, the original image data is not limited to binary data as mentioned above, but may be ternary, quaternary or the like.

For example, in a case where the original image data is ternary, data such as [0, 1, 2] may be converted into [0, 128, 255] or the like by the multi-valuing circuits 21 to 23, and the values ranging between 0 to 50 in the adder 61 may be normalized into 0 to 255 by the normalization section 62 in the multi-valuing section.

Multiplication coefficients used by the multipliers may be supplied from outside or may be stored in a ROM specially provided for the multiplication processing.

In accordance with this embodiment, in a case where masking process is applied to an n-valued image such as a binary or ternary data image, calculation is performed using non-smoothed image data for a main color, while calculation is performed using smoothed data for sub colors, whereby it is possible to perform masking on the n-valued image without impairing edge information and maintaining the accuracy of desired dot positions. Thus, the present invention is capable of improving the image quality.

In the present embodiments, only the image processing unit has been described. However, if the present invention is applied to a color facsimile machine which transmits and receives n-valued image data, it is particularly effective in increasing the image quality.

Figure 1A:
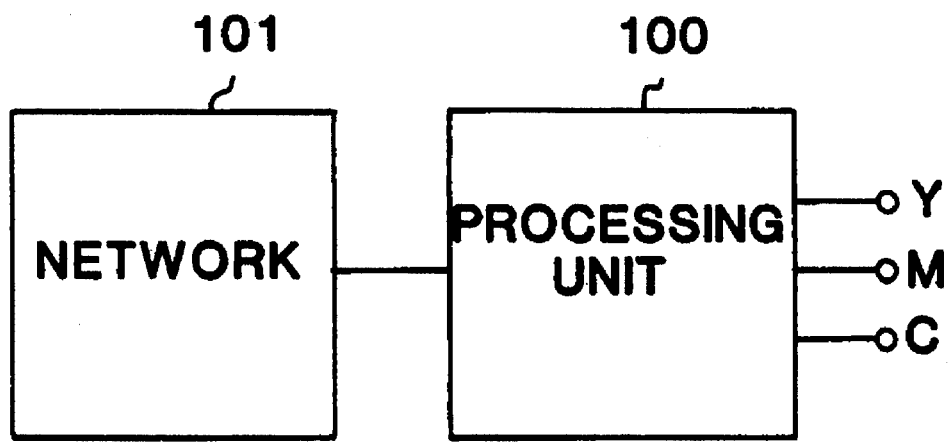
FIG. 1A is a block diagram showing a public network interconnected with the first or second embodiment.

For the purpose of applying the present invention to the above-mentioned color facsimile machine, the color processing unit in FIG. 1 or FIG. 5 requires additional processing unit 100 for the preceding stage of line buffers denoted by 1, 2 and 3, as shown in FIG. 1A. These units are a communication control unit for receiving signals from public network 101, an image data demodulation unit and a color signal processing unit (C-PROCESS) which extracts each color component, Y, M and C, from demodulated color data and outputs the resulting data that is independently synchronized. Furthermore the outputs of masking calculation section 7, 8 and 9 in FIG. 1, or the outputs of making binary section 100, 110 and 111 in FIG. 5 should be connected to a color printer. As for the color printer, an ink jet printer, an electrophotographic printer, a thermal transfer printer or the like can be used. In particular, it is preferable to use a binary printer, e.g., a bubble jet printer, for the construction of the color facsimile machine.

In accordance with the present embodiments, the average density of color data excluding main color data is obtained, while it is possible to obtain other kind of data having a value of the highest frequency or a median of frequencies.

As many apparently widely different embodiments of the present invention can be made without departing from the spirit and scope thereof, it is to be understood that the invention is not limited to the specific embodiments thereof except as defined in the appended claims.

What is claimed is:

1. A color image processing apparatus which converts n-level image pixels of a first geometric area of an image into m-level image pixels (n<m), comprising:

first multi-valuing means for generating an m-level main-color-component signal based on an n-level signal representing a main color component of pixels in the first geometric area of the image;

second multi-valuing means for forming a signal representative of a pixel density for at least one sub-color component, in a second geometric area of the image having a greater number of pixels than the first geometric area of the image;

color masking means for mask correcting the main-color-component signal generated by said first multi-valuing means for the first geometric area of the image based on the pixel density representative signal formed by said second multi-valuing means; and image forming means for forming an image based on the mask corrected image on a medium.

2. A color image processing apparatus according to claim 1, wherein the first region contains only a pixel of interest.

3. A color image processing apparatus according to claim 1, wherein said second multi-valuing means further comprises:

first means for calculating sums of pixels for respective sub-color components located in the second geometric area; and second means for calculating average densities of the second geometric area for respective ones of said sub-color components based on the sums of the pixels obtained by said first means for calculating.

4. A color image processing apparatus according to claim 1, wherein when the main-color component signal obtained by said first multi-valuing means is X, average-density signals for sub-color-components are Y and Z, respectively and the main-color-component signal after correction is D, said masking means corrects the main-color-component signal as follows:

$$D = a_{P1}X + a_{P2}b_cY + a_{P3}b_cZ$$

where $a_{P1}$, $a_{P2}$ and $a_{P3}$ represent predetermined coefficients and $b_c$ represents a correction coefficient.

5. A color image processing apparatus according to claim 1, wherein said first multivaluing means provides the m-level signal by way of a network.

6. A color image processing apparatus according to claim 1, wherein said color component signal includes three primary color components.

7. A color image processing apparatus according to claim 1, wherein said image forming means applies signals corrected by said masking means to a printer.

8. A color image processing apparatus according to claim 7, wherein said printer is an ink jet printer.

9. A color image processing apparatus according to claim 8, wherein said ink jet printer is a bubble jet printer.

10. A color image processing apparatus which converts n-level image pixels of a first geometric area of an image into m-level image pixels (n<m), comprising:

first multi-valuing means for generating an m-level main-color-component signal based on an n-level signal representing a main color component of pixels located in the first geometric area of the image;

second multi-valuing means for forming signals representing respective pixel densities for sub-color components in a second geometric area of the image having a greater number of pixels than the first geometric area of the image;

color masking means for mask correcting the main-color-component signal generated by said first multivaluing means for the first geometric area of the image based on the pixel density representative signals formed by said second multi-valuing means;

binarizing means for binarizing the main-color-component signal corrected by said masking means using a density storage type method; and image forming means for forming an image based on the binarized signal on a medium.

11. A color image processing apparatus according to claim 10, wherein the first geometric area contains only a pixel of interest.

12. A color image processing apparatus according to claim 10, wherein said second multi-valuing means further comprises:

first means for calculating a respective sum of pixels for each of said sub-color components located in the second geometric area; and second means for calculating a respective average density of the second geometric area for each of said sub-color components based on the sums obtained by said first means for calculating.

13. A color image processing apparatus according to claim 10, wherein, when the main-color-component signal obtained by said first multi-valuing means is X, average-density signals for said sub-color components are Y and Z, respectively, and the main-color-component signal after correction is D, said masking means corrects the main-color-component signal as follows:

$$D = A_{P1}X + a_{P2}Y + a_{P3}Z$$

where $a_{P1}$, $a_{P2}$ and $a_{P3}$ represent predetermined coefficients.

14. A color image processing apparatus according to claim 10, wherein said first multi-valuing means inputs said n-level signal by way of a network.

15. A color image processing apparatus according to claim 10, wherein said color component signals include three primary color components.

16. A color image processing apparatus according to claim 10, wherein said image forming means applies the binarized signals to a printer.

17. A color image processing apparatus according to claim 16, wherein said printer is an ink jet printer.

18. A color image processing apparatus according to claim 17, wherein said ink jet printer is a bubble jet printer.

19. A color image processing method, comprising the steps of:

inputting a plurality of m-level color component signals of an image;

generating an n-level color component signal for a main color component signal (n>m) from the input plurality of m-level color component signals of a first geometric area of the image by multi-valuing;

forming an n-level color component signal with respect to a sub-color component other than the main color component by using signals of pixels in a second geometric area of the image having a greater number of pixels than the first geometric area of the image by multi-valuing; and performing color masking correction on the generated n-level color component signal for the main color component signal of the first geometric area of the image by using the formed sub-color signal; and forming an image based on the mask corrected image on a medium.

20. A color image processing method according to claim 19, wherein the color component signal includes signals for three primary color components.

21. A color image processing method according to claim 19, wherein the m-level color component signal is a 1-bit signaL.

22. A color image processing method according to claim 19, wherein the n-level color component signal is an 8-bit signal.

23. A color image processing method that converts n-level image pixels of an image into m-level image pixels (n<m), comprising the steps of:

generating an m-level main-color-component signal based on an n-level signal representing a main color component of pixels in a first geometric area of the image by multi-valuing;

forming signals representing respective pixel densities for sub-color components in a second geometric area of the image having a greater number of pixels than the first geometric area of the image by multi-valuing;

color masking-correcting the generated main-color-component signal of the first geometric area of the image by mask correcting based on the formed pixel density representing signals for the sub-color components; and forming an image based on the mask corrected image on a medium.

24. A color processing method according to claim 23, wherein the first geometric area contains only a single pixel.

25. A color processing method according to claim 23, wherein, when the main color component signal is X, average-density signals for sub-color component are Y and Z, respectively, represented by an average density taken over a predetermined number of pixels, and the main-color-component signal after correction is D, the main color component signal is corrected as follows:

$$D=a_{P1}X+a_{P2}b_cY+a_{P3}b_cZ$$

where $a_{P1}$, $a_{P2}$ and $a_{P3}$ represent predetermined coefficients and $b_c$ represents a correction coefficient.

26. A color image processing method according to claim 23, wherein the m-level signal is provided by way of a network.

27. A color image processing method according to claim 23, wherein the color component signals include signals for three primary color components.

28. A color image processing method that converts n-level image pixels of an image into m-level image pixels (n<m), comprising the steps of:

generating an m-level main-color-component signal based on an n-level signal representing a main color component of pixels located in a first geometric area of the image by multi-valuing;

forming, by multi-valuing, signals representing respective pixel densities for sub-color components in a second geometric area of the image having a greater number of pixels than the first geometric area of the image;

color masking-correcting the generated main-color-component signal of the first geometric area of the image by mask correcting based on the formed pixel density representative signals for the sub-color components;

binarizing the color mask corrected main-color-component signal of the image using a density storage type method; and forming an image based on the binarized signal on a medium.

29. A color image processing method according to claim 28, wherein first geometric area contains only a single pixel.

30. A color image processing method according to claim 28, wherein, when the main-color-component signal is X, average-density signals for sub-color-components are Y and Z, respectively, represented by an average density taken over a predetermined number of pixels, and the main-color-component signal after correction is D, the main-color-component signal is corrected as follows:

$$D=a_{P1}+a_{P2}Y+a_{P3}Z$$

where $a_{P1}$, $a_{P2}$, and $a_{P3}$ represents predetermined coefficients.

31. A color image processing method according to claim 28, wherein the n-level signal is input by way of a network.

32. A color image processing method according to claim 28, wherein the color component signal includes signals for three primary color components.

33. A color image processing apparatus, comprising:

input means for inputting n-level color image data;

converting means for converting the n-level color image data into m-level color image data;

correcting means for correcting the m-level color image data (m>n);

binarizing means for binarizing the corrected color image data by using a density-storage type binarizing method; and image forming means for forming an image based on the binarized color image data on a medium.

34. A color image processing apparatus according to claim 33, wherein the n-level color image data is binary data representing a color image.

35. A color image processing apparatus according to claim 33, wherein the correcting means performs a masking processing.

36. A color image processing apparatus according to claim 33, wherein said image forming means is a bubble jet printer.

37. A color image processing method, comprising the steps of:

inputting n-level color image data;

converting the n-level color image data into m-level color image data;

correcting the m-level color image data;

binarizing the corrected color image data by using a density-storage type binarizing method; and forming an image based on the binarized color image data on a medium.

* * * * *

UNITED STATES PATENT AND TRADEMARK OFFICE
CERTIFICATE OF CORRECTION

PATENT NO. : 5,488,672
DATED : January 30, 1996
INVENTOR(S) : Yoshinobu MITA

It is certified that error appears in the above-indentified patent and that said Letters Patent is hereby corrected as shown below:

On title page, item

[73] ASSIGNEE:

"Canon Kasbushiki Kaisha" should read --Canon Kabushiki Kaisha--

[57] ABSTRACT:

Line 3, "types" should read --types applied--;
Line 4, "sub color" should read --sub-color--; and
Line 5, "then" should read --after which--.

COLUMN 1:

Line 13, "n-valued image" should read --n-valued image data (--.

COLUMN 2:

Line 58, "masking." should read --masking:--; and
Line 60, "1" should read --①--.

COLUMN 3:

Line 37, "sub colors" should read --sub-colors--;
Line 43, "only target" should read --only the target--;
Line 49, "human." should read --human eye.--; and
Line 66, "sub colors" should read --sub-colors--.

UNITED STATES PATENT AND TRADEMARK OFFICE
CERTIFICATE OF CORRECTION

PATENT NO. : 5,488,672
DATED : January 30, 1996
INVENTOR(S) : Yoshinobu MITA

It is certified that error appears in the above-indentified patent and that said Letters Patent is hereby corrected as shown below:

COLUMN 4:

Line 9, "sub color" should read --sub-colors--.

COLUMN 5:

Line 3, "multi] valuing" should read --multi-valuing--; and
    Line 55, "sub color" should read --sub-color--.

COLUMN 7:

Line 11, "sub" should read --sub- --;
    Line 36, "sub color" should read --sub-color--; and
    Line 66, "binary from" should read --binary form--.

COLUMN 8:

Line 9, ""reinarize"" should read --"rebinarize"--; and
    Line 14, "nereby" should read --nearby--.

UNITED STATES PATENT AND TRADEMARK OFFICE
CERTIFICATE OF CORRECTION

PATENT NO. : 5,488,672
DATED : January 30, 1996
INVENTOR(S) : Yoshinobu MITA

Figure 1B:
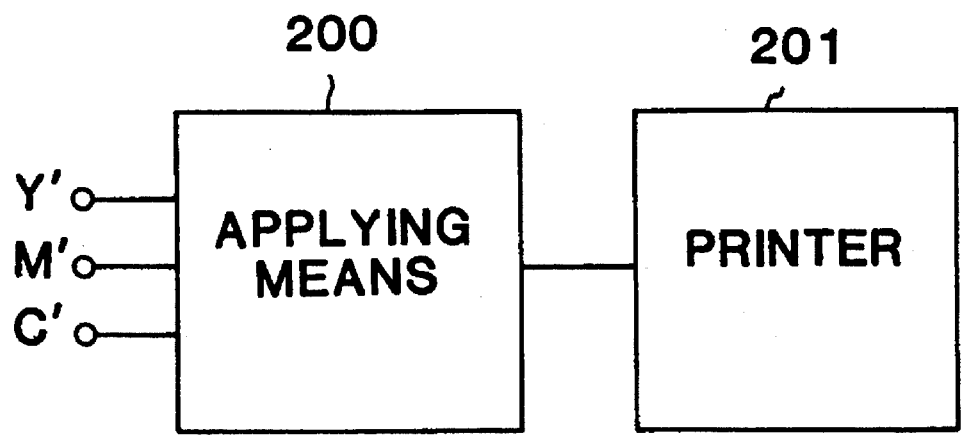
FIG. 1B is a block diagram showing a printer connected with the first or second embodiment.

It is certified that error appears in the above-indentified patent and that said Letters Patent is hereby corrected as shown below:

COLUMN 9:

Line 1, "printer." should read
--printer 201 (Fig. 1B), via an applying means 200.--; and
Line 60, "multivaluing" should read
--multi-valuing--.

COLUMN 10:
Line 49, "$D=A_{P_1}X+a_{P_2}Y+a_{P_3}Z$" should read
--$D=a_{P_1}X+a_{P_2}Y+a_{P_3}Z$--.

COLUMN 12:

Line 26, "$D=a_{P_1}+a_{P_2}Y+a_{P_3}Z$" should read
--$D=a_{P_1}X+a_{P_2}Y+a_{P_3}Z$--.

Signed and Sealed this

Seventeenth Day of June, 1997

Attest:

Attesting Officer

BRUCE LEHMAN

Commissioner of Patents and Trademarks